United States Patent [19]

Poupard et al.

[11] Patent Number: 5,083,070
[45] Date of Patent: Jan. 21, 1992

[54] INDEX TABLE WITH CENTER MOUNTED ROBOT ARM

[75] Inventors: Mark D. Poupard, Jackson; Edward L. Cooper, Clarklake, both of Mich.

[73] Assignee: Accubilt, Inc., Jackson, Mich.

[21] Appl. No.: 521,414

[22] Filed: May 10, 1990

[51] Int. Cl.⁵ ............................................. G05B 1/06
[52] U.S. Cl. ............................. 318/568.1; 318/571; 318/561; 318/640; 901/20; 395/1
[58] Field of Search .................... 318/560–646; 364/513; 901/3, 9, 12, 13, 16–23; 409/138

[56] References Cited

U.S. PATENT DOCUMENTS

| | | | |
|---|---|---|---|
| 3,596,153 | 7/1971 | Braimard | 318/640 |
| 3,734,421 | 5/1973 | Karlson et al. | 318/571 X |
| 4,203,064 | 5/1980 | Suzuki et al. | 318/640 |
| 4,366,423 | 12/1982 | Inaba et al. | 318/563 |
| 4,562,391 | 12/1985 | Inoue | 318/568 |
| 4,969,108 | 11/1990 | Webb et al. | 901/42 X |
| 4,972,347 | 11/1990 | Tarvin et al. | 901/3 X |
| 4,978,274 | 12/1990 | de Groot | 901/20 X |
| 4,987,765 | 1/1991 | Nishimura et al. | 29/33 |
| 4,993,896 | 2/1991 | Dombrowski et al. | 409/138 |

*Primary Examiner*—Paul Ip
*Attorney, Agent, or Firm*—Beaman & Beaman

[57] ABSTRACT

A combination work supporting table and computer controlled robot wherein, preferably, a rotatable index table includes a concentric column having a computer controlled robot mounted upon the column outer end in spaced relationship to the table work supporting surface. A computerized robot controller controls both the robot and the rotation of the index table permitting an extensive range of robot movement over a large work area in a concise space.

4 Claims, 3 Drawing Sheets

INDEX TABLE WITH CENTER MOUNTED ROBOT ARM

BACKGROUND OF THE INVENTION

Computer controlled robots are being increasingly employed in the manufacturing and fabrication arts. Robots are widely used for welding, drilling, sawing and other manufacturing and fabricating techniques.

Index tables are used as supports for work pieces wherein work pieces mounted upon the table surface are indexed between stations wherein sequential machining or working operations occur. With the advent of computerized robots, index tables have also been used in conjunction with robots mounted adjacent the index table wherein the robot controlled apparatus works upon work pieces mounted upon an index table. However, in such combination index table/robot installations extensive space requirements are necessary and relatively complicated robot movements are necessitated as the work rotates between various positions due to the index table rotation.

It is an object of the invention to provide a combination index table and computer controlled robot assembly wherein the robot is mounted upon a column coaxial with the index table axis of rotation, and the robot is capable of accessing the entire work supporting table surface.

Another object of the invention is to provide a combination index table and computerized robot wherein the robot acts upon work pieces located on the table support surface wherein the entire assembly is of a concise configuration occupying minimal floor space.

Yet another object of the invention is to provide a combination index table and computerized robot wherein the robot is mounted upon a column coaxial with the table axis of rotation, and is rotatably mounted upon the column, and wherein both the table movement and the robotic movements are computerized and programmed from a common source.

An additional object of the invention is to provide combination index table and computer controlled robot wherein high speed operations on a work piece located on the index table support surface are achieved with maximum accuracy and minimal robot movement.

In the practice of the invention the index table includes a base upon which an indexable table is mounted rotating about an axis of rotation, which is usually vertically oriented. The base includes conventional rotary and trust bearings to permit rotation of the table about its axis, and an electric motor rotates the table which may be precisely held at indexed locations by well known indexing detent devices.

The center of the index table is provided with a circular opening concentric to the axis of rotation through which a cylindrical column extends which is firmly affixed to the base. A collar is rotatably mounted upon the upper end of the column, and a robotic apparatus for working on work pieces is mounted upon the collar. The robot usually consists of a plurality of hinged arms employing servo motors for changing the angular position of the arms, and the outermost arm includes the tool or fabricating apparatus such as a welder, drill, cutting tool, or the like. The particular form of the robot mounted upon the column does not constitute an aspect of the present invention. The robot is controlled by conventional programmed computerized equipment wherein the robot may be readily programmed to perform a plurality of sequential operations on work pieces located in fixtures on the index table surface.

Rotation of the index table is through an electric motor also connected to the computerized apparatus whereby both the robotic movement and the rotation of the index table can be synchronized and correlated. Sensors sensing the rotative position of the index table work supporting surface also provide information to the computerized control, wherein the operation of the robot and index table may be accurately programmed to move the work pieces through a plurality of stations or movements, and simultaneously, move the robot tool through the desired path and program.

As both the index table and the robot are capable of substantially 360° rotation about the table axis of rotation a plurality of work stations may be defined upon the index table work supporting surface permitting work to be located on and removed from jigs and fixtures mounted upon the table work surface, and the rotative movement of the robot may be correlated to the index movement wherein operations occurring on the work piece can be correlated to the work piece position to most effectively account for time.

As the robot is centrally mounted with respect to the index table no additional floor space is required for the robot support, and the robot may be rotated relative to its supporting column substantially through a complete revolution wherein the robot may follow the work piece throughout its index table movement.

Apparatus constructed in accord with the invention is of a concise configuration minimizing the floor space required for apparatus of this type, costs are reduced, and the time for performing operations on the work piece may be reduced in view the more efficient path of travel between the index table, work piece and robot.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 1:
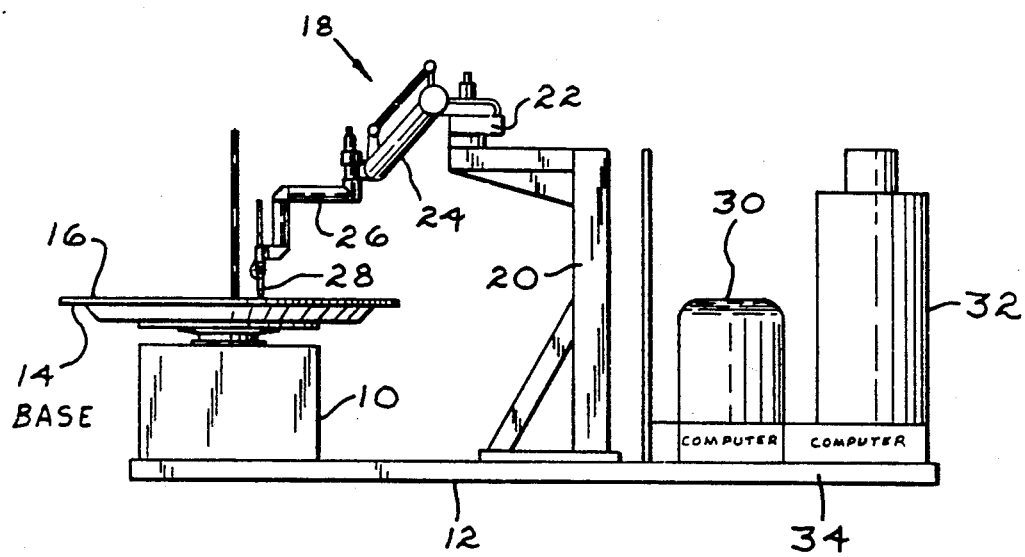
FIG. 1 is an elevational view of a prior art index table and computer controlled robot installation.

In FIG. 1 a typical prior art index table and computer controlled robot installation is illustrated. The index table assembly includes a base 10 mounted upon a floor plate 12. The index table 14 is rotatably mounted upon bearings, not shown, so as to have a vertical axis of rotation, and work pieces, jigs and fixtures, not shown, are mounted upon the table work supporting surface 16. The index table is adapted to be rotated by an electric motor, not shown, and selectively indexed to desired rotational positions about its axis.

The computer controlled robot generally indicated at 18 is mounted upon support bracket 20 affixed to the floor plate 12. The robot includes a collar 22 rotatably mounted upon the bracket 20, and the robot consists of a plurality of pivotally interconnected arms 24 and 26, each arm being associated with an appropriate motive means, such as a servo motor, whereby the pivotal motion of an arm may be accurately controlled. The outermost arm 26 is provided with a tool generally indicated at 28, which may consist of a cutting tool, drill, welding electrode, or similar device commonly employed with robotic machine tools.

Control of the robot 18 and the rotation of the index table 14, is by means of the programmed computers 30 and 32 located on the floor plate 34.

In the aforedescribed prior art arrangement the fact that the robot supporting bracket 20 is mounted alongside the index table 14 requires that the floor plate 12 be of relatively large size to adequately support both the index table and the robot apparatus, and it will be appreciated that the movement of the robot tool over the surface of the index table is always in an extended relationship, and in view of the rotative nature of work mounted upon the index table it is necessary for the tool to move through a rotative pass when operating upon index table mounted work pieces. Also, the presence of the bracket 20 adjacent the table 14 and the robot overhang, limit access to the table 14.

Figure 2:
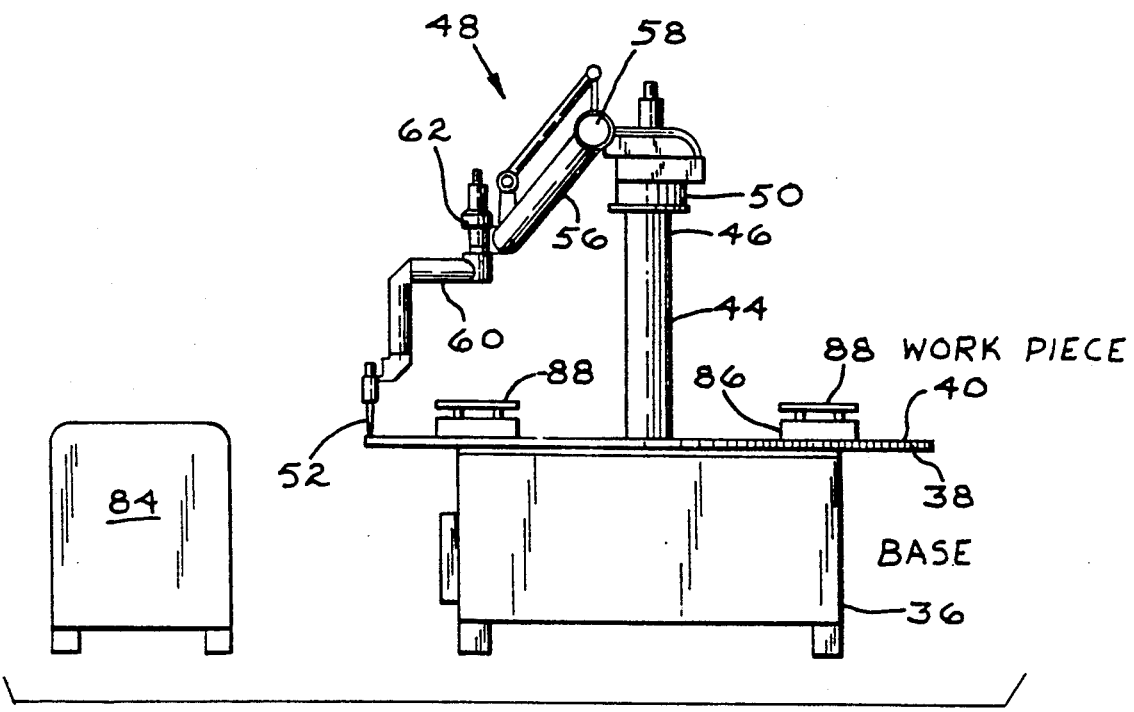
FIG. 2 is an elevational view of an index table and robot in accord with the concepts of the invention.
Figure 3:
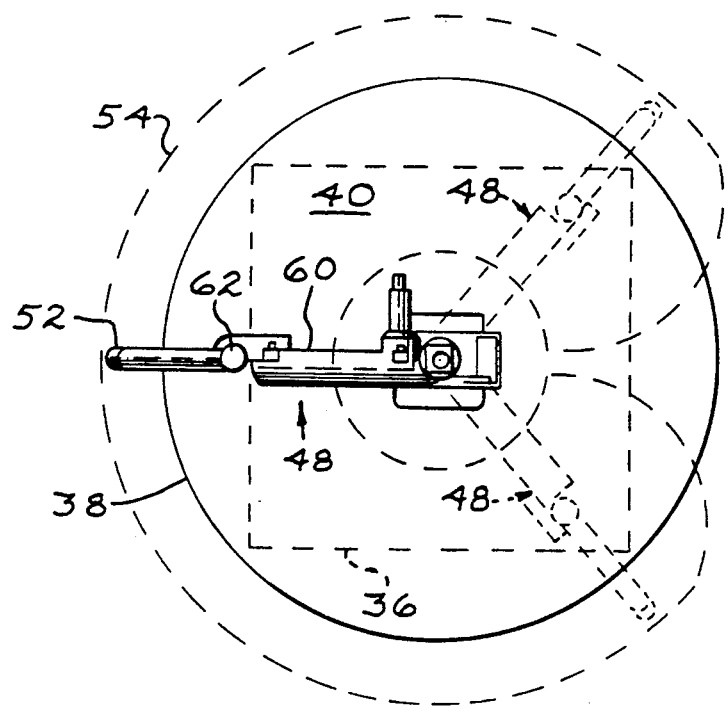
FIG. 3 is a plan view of the index table and robot in accord with the invention as taken from the top of FIG. 2.

The basic inventive concepts of the invention are best appreciated from FIGS. 2 and 3. In these FIGURES the index table base is represented at 36, and the index table assembly includes a rotative index table 38 having a horizontally disposed work supporting surface 40. The index table 38 is rotated by an electric motor, as later described, and electrical means, and index means, sense and determine the rotative position of the index table 38 about its axis of rotation, which is usually vertically oriented.

The index table 38 is provided with a circular central opening 42 concentric with the table axis of rotation, and the cylindrical column 44 extends through the table opening having a longitudinal axis concentric and coaxial with the table axis of rotation. The column 44 is supported on the base 36 by the anchor plate 45. At its upper end 46, the computer controlled robot 48 is affixed to the column, and the robot may consist of a plurality of pivotally interconnected arms identical to the robot 18 shown in FIG. 1. The robot 48 is mounted upon a collar 50 rotatably mounted on the column upper end for rotation by the motor 51 wherein the computer arms may rotate relative to the column. As it is necessary that electrical conductors supply and control the robot, and as such conductors and connectors extend through the hollow column 44, the robot arms can rotate through substantially 300° of rotation on the column and the tool 52 is capable of covering an area on the index table as represented by the dotted lines 54 of FIG. 3.

The robot 48 may be of any conventional type, and includes an arm 56 which pivots about a horizontal pivot, and is rotated about its pivot by electric servo motor means generally indicated at 58. The arm 56 includes a vertical pivot from which the L-shaped arm 60 extends, and a servo motor 62 determines the angular relationship of the arm 60 to the arm 56. The tool 52 is mounted on the free end of the arm 60. Any type of computer controlled robot may be mounted upon the column 44, and the disclosed and described type is that such as manufactured by Miller Electric Manufacturing Mfg. Co. of Appleton, Wis., Model MRH-5, as used for arc welding purposes.

Figure 4:
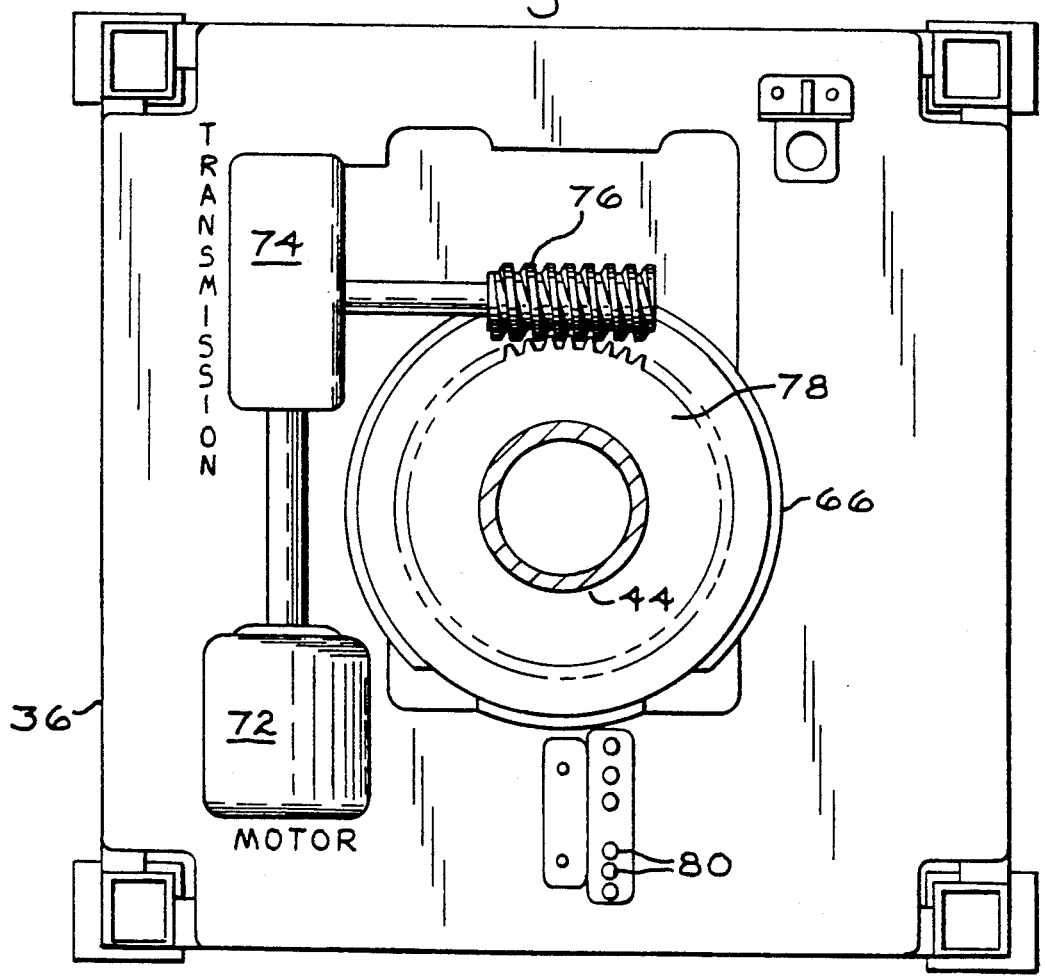
FIG. 4 is an elevational sectional view as taken through the index table base along Section 4—4 of FIG. 5.
Figure 5:
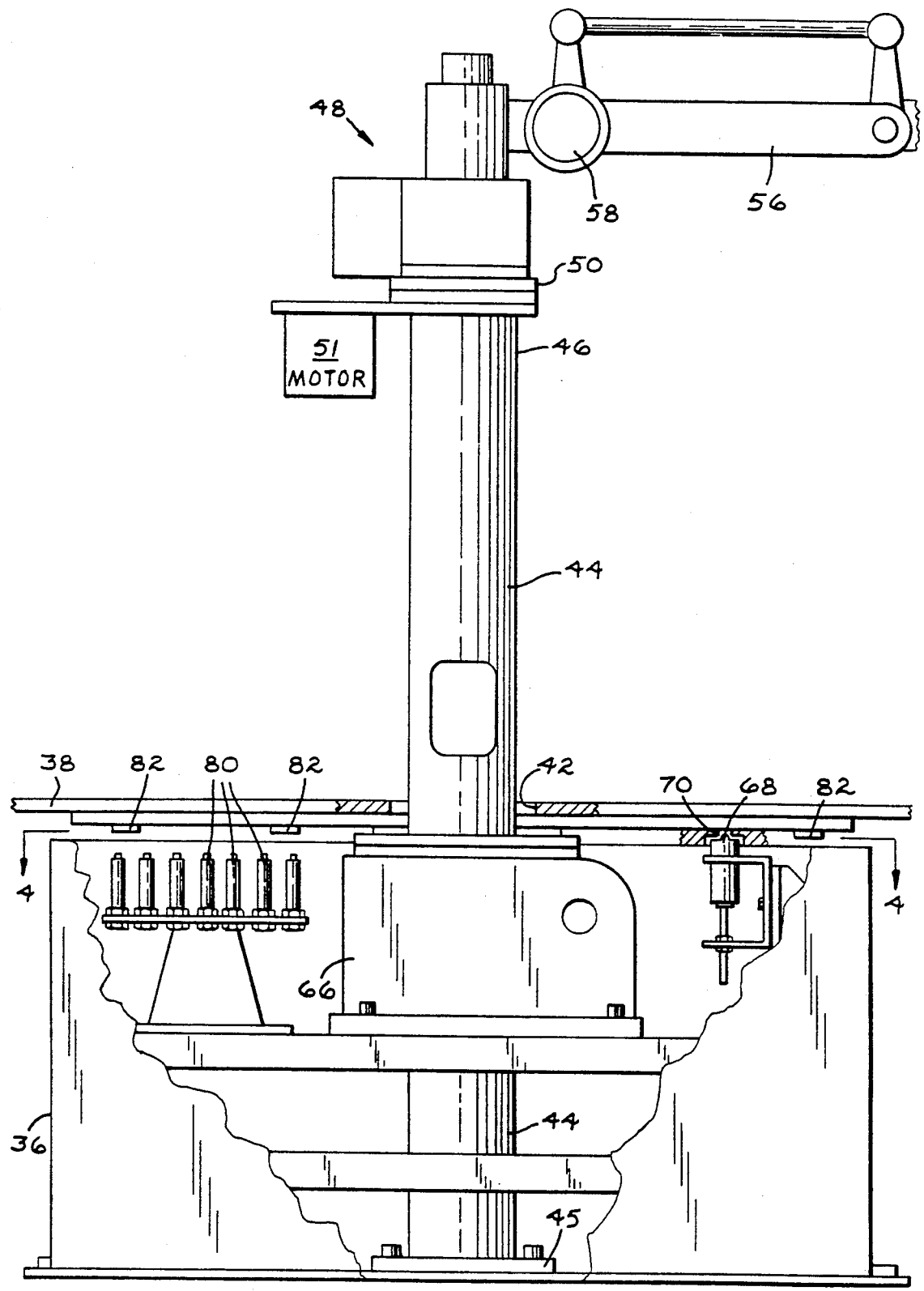
FIG. 5 is an elevational view, partially broken away, illustrating the index table and robotic apparatus.

As will be appreciated from FIGS. 4 and 5, the index table base includes bearing structure 66, FIG. 4, supporting the index table 38 for rotation about its vertical axis, and the base also includes index apparatus which is electrically controlled including a detent 68 selectively cooperating with holes or recesses 70 defined on the underside of the work piece index table 38 for fixing the rotative position of the index table relative to the base, as is well known.

Rotation of the index table is accomplished by the electric motor 72 driving the transmission 74 which in turn associates with the worm gear 76 engaging the worm wheel 78 concentrically affixed to the index table 38 Thus, energization of the reversible electrical motor 72 will rotate the index table 38 in the desired direction as long as the detent 68 is not located in a recess 70.

The rotative position of the index table is sensed by a plurality of electrical sensors 80 mounted on the base 36, FIGS. 4 and 5, sensing indicators 82 mounted on the underside of the table 38. The position of the indicators 82 and the position of the sensors 80 is such that a desired angular position of the index table will produce an electric signal to indicate a predetermined rotative index table position.

Control of the robot 48, and the rotation of the index table 38, is through the computer apparatus schematically shown in FIG. 2 at 84. The computer 84 may be located at some distance from the index table 38, for instance in the corner of a room, and the usual feedback sensors and the like associated with the robot 48 and its motors 58 and 72 will permit the robot arms 56 and 60 to be positioned as desired.

Additionally, the index table motor 72, and the index table sensors 80, and the index detent 68 are electrically connected to the computer 84 wherein the operations of these components is computer controlled and coordinated with the desired robotic movements. Accordingly, by the desired programming, as well known in the art, the rotation of the index table 38 and the movement of the robot arms, can be sequential or simultaneously operated, as programmed.

Typically, a plurality of work holding jigs or fixtures schematically shown in FIG. 2, only, at 86 are mounted upon the index table surface 40 upon which work pieces 88 are clamped. An operator standing at one location adjacent the index table 38 may load and unload the fixtures as they pass his station, and as the index table is rotated about its axis of rotation the robot tool 64 will perform the desired operations on the work piece.

The central mounting of the robot 48 relative to the index table 38 permits the tool 64 to "follow" the work piece as it rotates with the index table with a smooth continuous movement, and the tool can rotate "ahead" or "behind" the work piece with respect to its rotation due to the index table movement with a minimum of difficulty since both table and robot are rotating about the same axis. Hence, the central mounting of the robot with respect to the index table permits a versatility and accuracy of positioning of the robot relative to a rotatable movable work piece no heretofore known, and the combination of the index table and centrally mounted robot permits robotic operations to be accomplished faster and more accurately than previously attainable with similar apparatus wherein the robot is mounted relative to the index table as shown in FIG. 1. Furthermore, the apparatus incorporating the invention is more concise than the prior art apparatus requiring significantly less floor space, and providing much improved access to the index table work supporting surface throughout its circumference.

Modifications to the inventive concepts may be apparent to those skilled in the art without departing from the spirit and scope of the invention.

We claim:

1. In combination, a base, a rotatable index table having an axis of rotation and a work supporting surface substantially perpendicular to said axis of rotation mounted on said base, motor means selectively rotating said index table on said base about said axis of rotation, electrical sensing means defined on said base and index table indicating the rotative position of said table with respect to said base, a column mounted on said base extending from said work supporting surface substantially concentric to said axis having an outer end spaced from said work supporting surface, a computer controlled rotatable robotic tool mounted on said column outer end, said computer controlled robotic tool comprising a robot consisting of a plurality of servo-motor powered arms, a computer control operatively connected to said robotic tool, said electrical sensing means and said motor means, said computer control operating said robotic tool and rotating said index table in a programmed manner to cause said robotic tool to work on work pieces mounted on said work supporting surface.

2. In a combination as in claim 1, means rotatably mounting said robotic tool upon said column outer end for rotation concentric to said table axis of rotation.

3. In combination, an index table having a base, bearings mounted on said base defining an axis of rotation, a work supporting table mounted in said bearings having a rotation axis co-axial with said bearings' axis of rotation and a work supporting surface, a central opening defined in said work supporting surface substantially concentric to said bearings' axis of rotation, a column support defined on said base alignment with said opening, a column mounted in said column support extending through said opening and having an outer end in spaced relation to said work supporting surface, a computer controlled robotic tool mounted on said column upper end for rotation about said table rotation axis, a computer control operatively connected to said robotic tool, said computer controlled robotic tool comprising a robot consisting of a base collar mounted on said column upper end, a plurality of servo-motor powered arms supported by said base collar and motor means operatively connected to said work supporting table for selectively rotating said table about said rotation axis, said computer control controlling operation of said motor means and rotation of said work supporting table, electrical sensing means defined on said base and work supporting table indicating the rotative position of said table with respect to said base, said sensing means being electrically connected to said computer control.

4. In the combination as in claim 3, said base collar being rotatably mounted on said column upper end.

* * * * *